United States Patent [19]

Ogita et al.

[11] 3,882,398
[45] May 6, 1975

[54] RECEIVING FREQUENCY INDICATOR SYSTEM FOR BROADCAST RECEIVER

[75] Inventors: Minoru Ogita; Teruyoshi Matsui, both of Hamamatsu, Japan

[73] Assignee: Nippon Gakki Seizo Kabushiki Kaisha, Hamamatsu-shi, Japan

[22] Filed: Jan. 24, 1973

[21] Appl. No.: 326,477

[30] Foreign Application Priority Data

| Feb. 14, 1972 | Japan | 47-015449 |
| Oct. 25, 1972 | Japan | 47-123141 |
| Oct. 25, 1972 | Japan | 47-123142 |
| Nov. 25, 1972 | Japan | 47-135796 |

[52] U.S. Cl. ............... 325/455; 324/78 J; 324/79 R; 325/363; 325/438
[51] Int. Cl. ........................................... H04b 1/16
[58] Field of Search ............... 324/78 F, 78 J, 79 R; 325/334, 430, 438, 452, 455, 349, 134, 363, 364; 331/64 R; 343/112 A, 112 CA

[56] References Cited
UNITED STATES PATENTS

| 2,478,023 | 8/1949 | Summerhayes, Jr. et al... 325/134 R |
| 2,498,933 | 2/1950 | Wallace .............................. 325/364 |
| 3,008,043 | 11/1961 | Caulk .................................. 331/64 R |
| 3,019,389 | 1/1962 | Ross et al. ........................... 325/363 |
| 3,045,233 | 7/1962 | Katz et al. ........................... 324/79 R |

Primary Examiner—Robert L. Griffin
Assistant Examiner—Marc E. Bookbinder
Attorney, Agent, or Firm—Cushman, Darby & Cushman

[57] ABSTRACT

A reference frequency signal is prepared by a fixed frequency oscillator or by multiplying the IF frequency. A receiving frequency representing signal is obtained as an output of the RF amplifier or that of the local oscillator. The two signals are mixed to produce a beat frequency signal, which is converted by a frequency detector into a d.c. voltage or current, which in turn is applied to a meter.

The meter carries a scale marked in frequencies, the pointer indicating the receiving frequency.

6 Claims, 7 Drawing Figures

3,882,398

RECEIVING FREQUENCY INDICATOR SYSTEM FOR BROADCAST RECEIVER

BACKGROUND OF THE INVENTION

1. Field of the Invention

The present invention relates to a receiving frequency indicator system for a broadcast receiver.

2. Description of the Prior Art

In a prior art device of the receiving frequency indicator system, a variable capacitor has been used as a component to determine the receiving frequency in which a rotary shaft of the variable capacitor was coupled to a needle of a dial through a link wire so that the position of the needle might indicate the receiving frequency.

In this type of device, however, since the accuracy of the variable capacitor is not uniform from one to the other, a considerable error is likely to occur in dial indication, the correction of such error taking considerable man power and time.

There has also been proposed a system wherein a variable capacitance diode was used as a component to determine the receiving frequency, together with a variable resistor for varying the voltage applied to the variable capacitance diode, a rotary shaft or sliding piece of the variable resistor being coupled to a dial needle through a link wire to indicate the receiving frequency. In this type of device, because of the ununiformity in the characteristic of the variable capacitance diode and the ununiformity in resistance change curves of the variable resistors, error also exists in the dial indication, which error is difficult to corrected.

Another system has been proposed in which the variable capacitance diode was used as a component to determine the receiving frequency and the voltage applied to the variable frequency diode was detected by an electro-mechanical displacement transducer such as a meter. Again, in this type of device, the indication tends to include error because of the ununiformity among the characteristics of the individual variable capacitance diodes.

Thus, in any of the known systems, it has been very difficult to accurately indicate the receiving frequency and took considerable amount of time and man power to correct the dial indication error. Particularly in an electronic tuning system utilizing a variable capacitance diode, the ununiformity in the change curve of the diode has been too large to make the correction of the indication error.

SUMMARY OF THE INVENTION

It is a first object of the present invention to frequency-detect a beat frequency signal of a local oscillator output and a fixed reference frequency oscillator to indicate the receiving frequency by the change of the frequency detector output by means of indicator such as meter.

It is a second object of the present invention to frequency-detect a bear frequency signal of a part of a radio frequency amplifier and a fixed reference frequency oscillator to indicate the receiving frequency by the change of the frequency detector output by means of indicator such as meter.

It is a third object of the present invention to generate a beat frequency signal from a local oscillator output and a frequency-multiplied signal of an intermediate frequency signal, and frequency-detect the change of the beat signal frequency to indicate the receiving frequency by the change of the output of the frequency detector by means of and indicator such as meter.

It is a fourth object of the present invention to generate a beat frequency from a part of a radio frequency output and a frequency-multiplied signal of an intermediate frequency signal, and frequency-detect the change of the beat signal frequency to indicate the receiving frequency by the change of the output of the frequency detector by means of and indicator such as meter.

It is a general object of the present invention to overcome the difficulties encountered in the prior art by the embodiments illustrated in the drawings.

DESCRIPTION OF THE PREFERRED EMBODIMENTS

The preferred embodiment of the present invention will now be described in detail with reference to the accompanying drawings.

Figure 1:
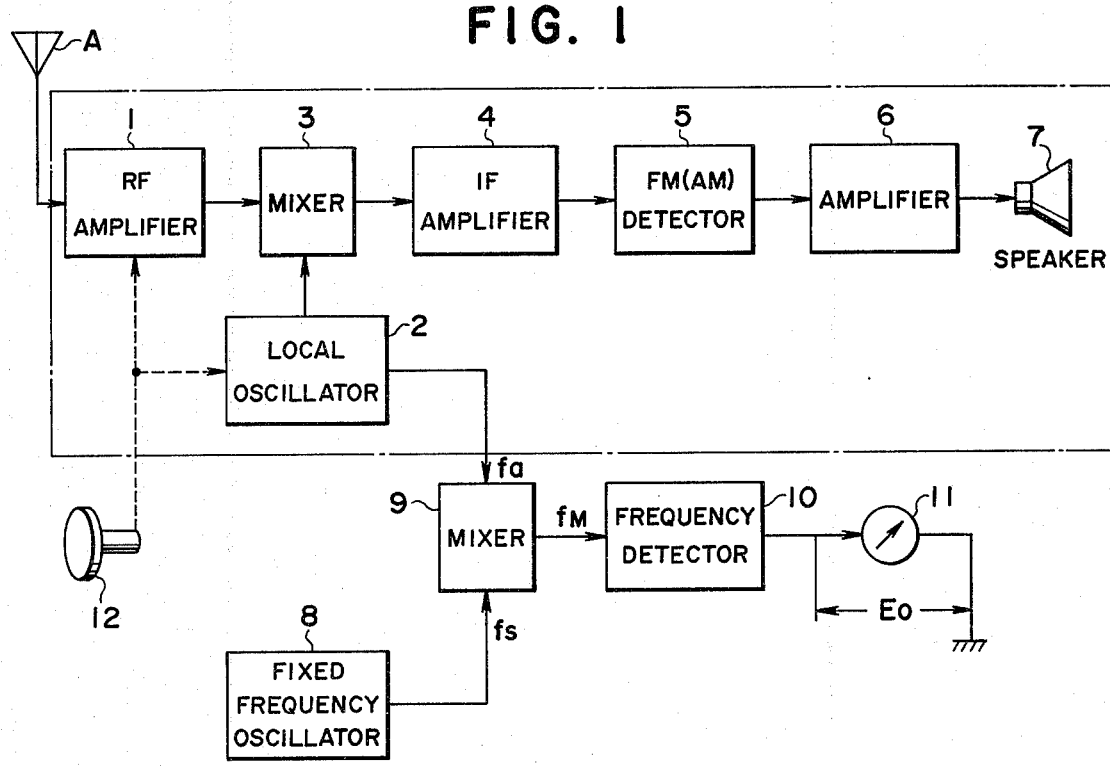
FIG. 1 is a block diagram of a preferred embodiment of the present invention which shows an arrangement of producing an indication output from a local oscillator and a fixed reference frequency oscillator output.

Referring to FIG. 1, a superheterodyne FM (AM) tuner shown encircled by a dot-and-dash line is arranged in such a manner that only the desired incoming electric wave of the incoming waves received by an antenna A is amplified by an RF amplifier 1, an amplified output of which is mixed with an output of a local oscillator 2 through a mixer 3 to produce an intermediate frequency (IF) signal, which is then amplified by an IF amplifier 4 and then demodulated by an FM (AM) detector 5 to produce an audio signal, which in turn is amplified by an amplifier 6 to be supplied to a speaker 7 whereby the desired incoming electric wave may be received and made audible.

In accordance with this embodiment, the receiving frequency is indicated in the above arrangement by producing a beat signal by mixing an output signal of the local oscillator 2 with an output signal of a separate fixed frequency oscillator 8 for generating a reference frequency through a mixer 9, applying the beat signal to a frequency detector 10 to convert it to a d. c. voltage (or current), and reading the voltage (or current) by means of an indicator 11 such as meter.

Figure 2:
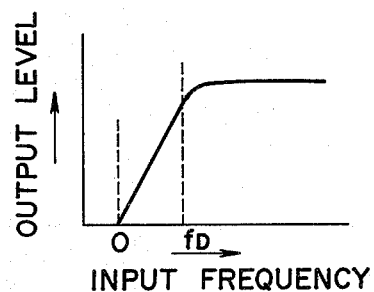
FIGS. 2 and 3 show graphs useful to explain the function of the arrangement.

For the frequency detector 10 a high-pass filter having a frequency characteristics as shown in FIG. 2 may be used.

Operation of the embodiment thus constructed will now be described.

By turning a tuning knob 12 of FIG. 1, the value of tuning frequency determining elements (variable capacitors or variable capacitance diodes) in the RF amplifier 1 and the local oscillator 2 vary with the rotation of the knob 12 to permit reception of a desired incoming electric wave.

In particular, the oscillation frequency fa of the local oscillator 2 varies from $f_L$ to $f_H$ in connection with the operation of the tuning knob 12, whereas the fixed frequency oscillator 8 constantly oscillates at frequency fs, which is equal to $f_L$, for example.

The outputs of the local oscillator 2 and the fixed frequency oscillator 8 (frequencies of respective outputs being fa and fs) are applied to the mixer 9, at an output of which a beat output signal of a frequency $f_M = fa - fs$ is detected, which frequency $f_M$ may vary from zero to $f_D = f_H - f_L$ with the operation of the tuning knob under the above condition.

Figure 3:
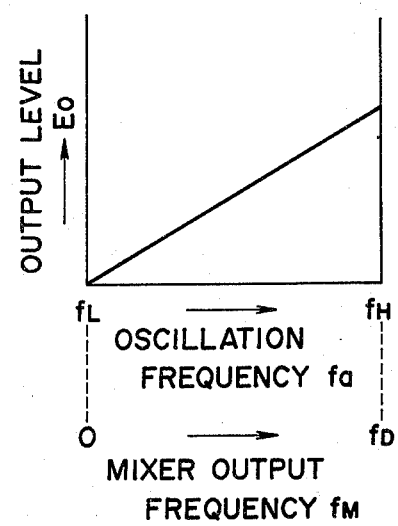

By inputting said beat output signal to the frequency detector 10, an output voltage Eo is produced which is proportional to an input frequency $f_M$ as shown in FIG. 3. By applying this output voltage to the indicator 11 such as a volt meter carrying a scale marked in frequencies, a needle pointer indication representing the receiving frequency may be obtained.

Figure 4:
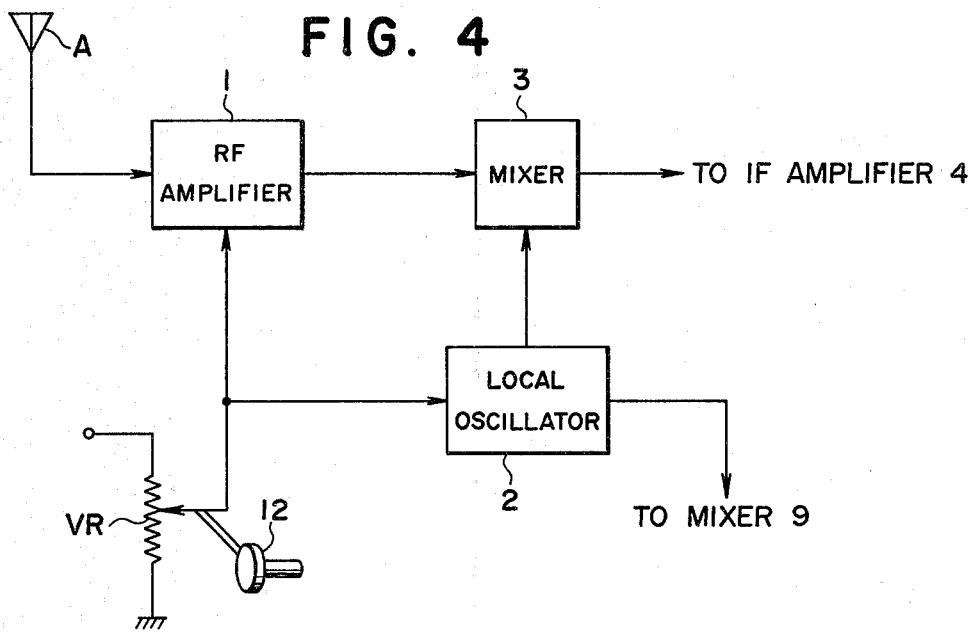
FIG. 4 is a block diagram of a modification in a major part of the above embodiment.

It is also possible within the scope of the present invention to practice a so-called electronic tuning type tuner in which, as shown in FIG. 4, a voltage applied across variable capacitance diodes (not shown) in the RF amplifier 1 and the local oscillator 2 are varied through a variable resistor VR linked to the tuning knob 12.

Figure 5:
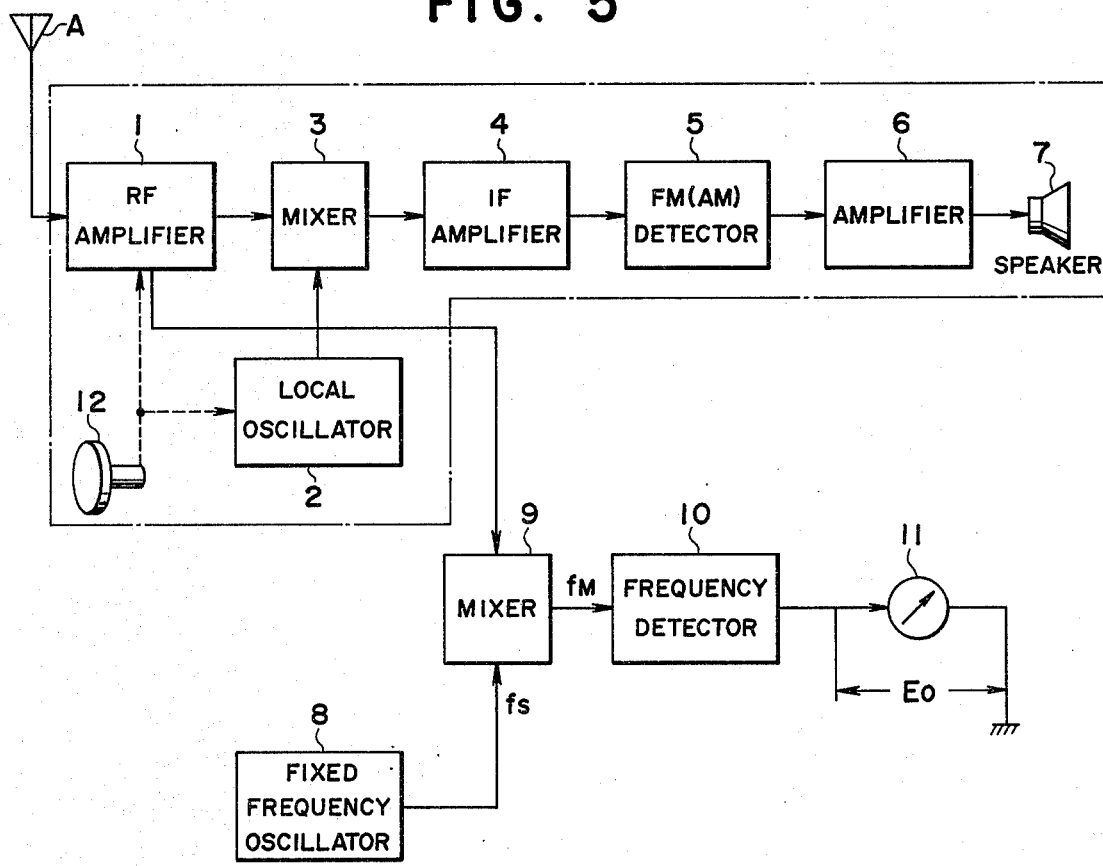
FIG. 5 is a block diagram of another embodiment of the present invention showing an arrangement of producing indication output from a part of a radio frequency amplifier output and a fixed reference frequency oscillator output.

Referring to FIG. 5 which shows another embodiment of the present invention, an arrangement of a superheterodyne FM (AM) tuner is shown encircled by a dot-and-dash line in which only a desired incoming electric wave of the incoming waves received by an antenna A is amplified by an RF amplifier 1, an amplified output of which is mixed with an output of a local oscillator 2 through a mixer 3 to produce an intermediate frequency (IF) signal, which is then amplified by an IF amplifier 4 and then demodulated by an FM (AM) detector 5 to produce an audio signal, which in turn is amplified by an amplifier 6 to be supplied to a speaker 7, whereby the desired incoming electric wave is received and made audible.

In accordance with this embodiment, the receiving freqeuncy is indicated by producing a beat frequency signal by mixing in a mixer 9 a part of an output signal (e. g. received carrier component) of the RF amplifier 1 with an output of a separate fixed frequency oscillator 8 for producing a reference signal, applying said beat signal to a frequency detector 10 to convert it to a voltage (current) change and reading this change by a indicator 11 such as meter.

For the frequency detector 10, a high-pass filter having a characteristics as shown in FIG. 2 may be used.

The operation of the embodiment thus constructed will now be described.

By turning a tuning knob 12 of FIG. 5, the values of tuning frequency determining elements (variable capacitors or variable capacitance diodes) in the RF amplifier 1 and the local oscillator 2 vary with the rotation of the knob 12 to permit reception of the desired incoming wave.

More particularly, the tuning frequency fa of the RF amplifier 1 varies from $f_L$ to $f_H$ in connection with the operation of the tuning knob 12, whereas the fixed frequency oscillator 8 constantly oscillates at a frequency of fs, which may be equal to $f_L$, for example.

By applying the outputs of the RF amplifer 1 and the fixed frequency oscillator 8 (the frequencies of respective outputs being fa and fs) to the mixer 9, a beat output signal of the frequency $f_M = fa - fs$ is detected at the output, which frequency $f_M$ varies from zero to $f_D = f_H - f_L$ with the operation of the tuning knob under the above condition.

By inputting said beat output signal to a frequency detector 10, an output voltage Eo is produced which is proportional to an input frequency $f_M$ as shown in FIG. 3, and by applying this output voltage to the indicator 11 such as a volt meter carrying a scale marked in frequencies, a needle pointer indication representing the receiving frequency can be accomplished.

The present embodiment may be practiced in a so-called electronic tuning type tuner in which, as shown in FIG. 4, by changing the voltage applied across variable capacitance diodes (not shown) in the RF amplifier 1 and the local oscillator through a variable resistor VR linked to the tuning knob 12.

Figure 6:
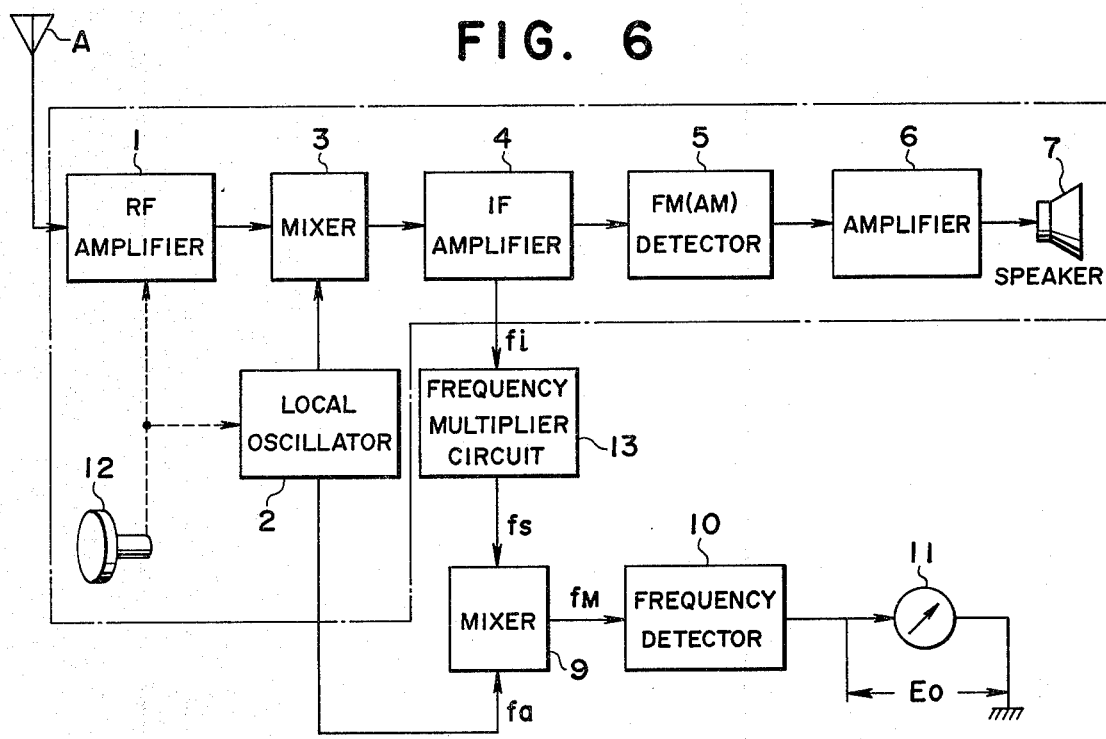
FIG. 6 is a block diagram of a further embodiment of the present invention showing an arrangement producing indication output from a local oscillator output and a frequency-multiplied signal of an intermediate frequency signal.

Referring to FIG. 6 which shows a further embodiment of the present invention, an arrangement of a super-heterodyne FM (AM) tuner is shown encircled by a dot-and-dash line in which only a desired incoming electric wave of the incoming waves received by an antenna A is amplified by an RF amplifier 1, an amplified output is mixed with an output of a local oscillator 2 through a mixer 3 to produce an intermediate frequency (IF) signal, which is then amplified by an IF amplifier 4 and then demodulated by an FM (AM) detector 5 to produce an audio signal, which in turn is amplified by an amplifier 6 to be supplied to a speaker 7 whereby the desired incoming signal is received and made audible.

In accordance with this embodiment, the receiving frequency can be indicated by producing a beat signal by mixing in a mixer 9 a fixed frequency-multiplied signal generated by frequency-multiplying an IF frequency in the IF amplifier 4 through a desired number of frequency-multiplier circuits 13 with an output signal of the local oscillator 2, applying said beat signal to a frequency detector 10 and reading this change by an indicator 11 such as a meter.

For the frequency detector 10, a high-pass filter having characteristic as shown in FIG. 2 may be used.

The operation of the embodiment thus constructed will now be described.

By turning a tuning knob 12 of FIG. 6, the values of frequency determining elements (variable capacitors or variable capacitance diodes) in the RF amplifier 1 and the local oscillator 2 vary with the rotation of the knob 12 to permit reception of the desired incoming wave.

More particularly, the oscillating frequency fa of the local oscillator 2 varies from $f_L$ to $f_H$ in connection with the operation of the tuning knob 12, whereas the output signal frequency of the frequency multiplier circuit 13 is fixed at a frequency, $fs = n \cdot fi$ for example, which is a multiple of the IF frequency fi (10.7 MHz) of the IE amplifier.

By applying the outputs of the local oscillator 2 and of the frequency multiplier circuit 13 (the frequencies of the respective outputs being fa and fs, the latter may be equal to $f_L$) to the mixer 9 a beat output signal of the frequency $f_M = fa - fs$ is detected at the output thereof, which frequency $f_M$ varies from zero to $f_D = f_H - f_L$ with the operation of the tuning knob under the above condition.

By inputting said beat output signal to the frequency detector 10, an output voltage Eo is produced which is proportional to an input frequency as shown in FIG. 3. By applying this output to an indicator 11 such as a volt meter carrying a scale marked in frequencies, a needle pointer indication representing the receiving frequency is attained.

The present embodiment may be practiced in a so-called electronic tuning type tuner in which, as shown in FIG. 4, the receiving frequency is selected by changing a voltage applied across variable capacitance diodes (not shown) in the RF amplifier 1 and the local oscillator 2 through a variable resistor VR linked to the tuning knob 12.

Figure 7:
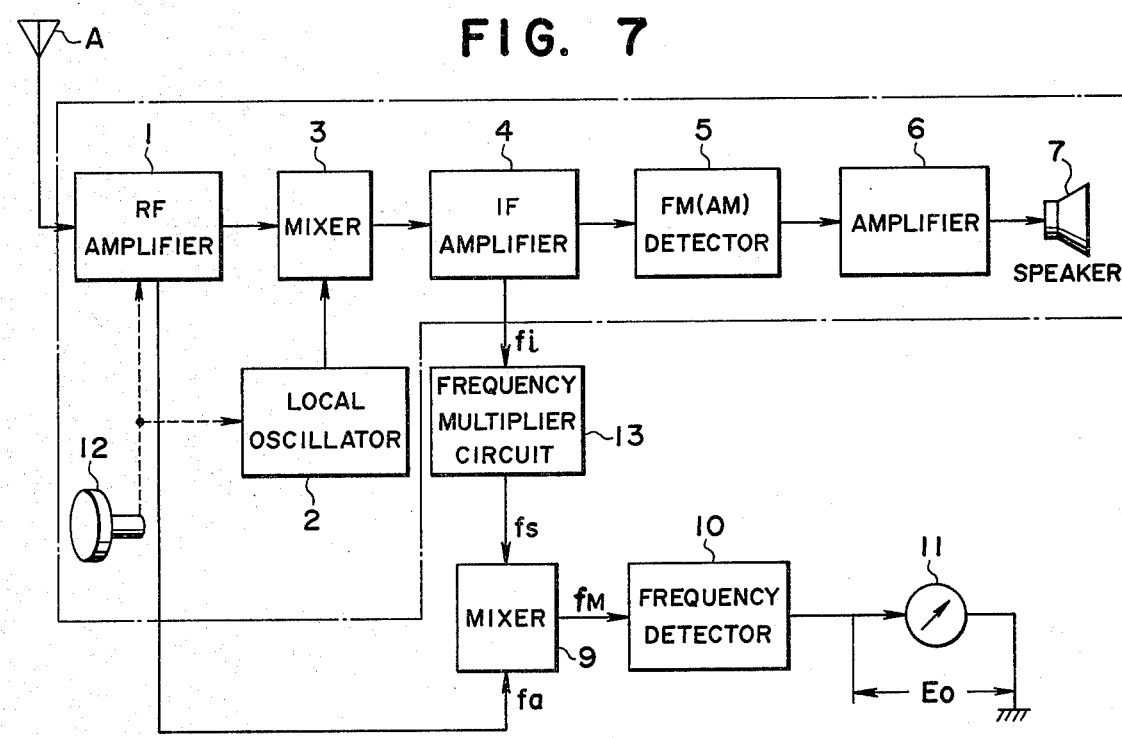
FIG. 7 is a block diagram of a further embodiment of the present invention showing an arrangement producing indication output from a part of a radio frequency amplifier output and a frequency-multiplied signal of an intermediate frequency signal.

Referring to FIG. 7 which shows a further embodiment of the present invention, an arrangement of a superheterodyne FM (AM) tuner is shown encircled by a dot-and-dash line in which only a desired incoming electric wave of the incoming waves received by an antenna A is amplified by an RF amplifier 1, an amplified output of which is mixed with an output of a local oscillator 2 through a mixer 3 to produce an intermediate frequency (IF) signal, which is then amplified by an IF amplifier 4 and then demodulated by an FM (AM) detector 5 to produce an audio signal, which in turn is amplified by an amplifier 6 to be supplied to a speaker 7, whereby the desired incoming wave is received and made audible.

In accordance with this embodiment, the indication of the receiving frequency is accomplished by producing a beat signal by mixing in a mixer 9 a frequency-multiplied signal of a fixed frequency produced by frequency-multiplying an IF frequency in the IF amplifier 4 through a frequency multiplier circuit 13 with an output signal (i. e. carrier component) of the RF amplifier, applying said beat signal to a frequency detector to convert it to a d. c. voltage (current), and reading this voltage (current) by an indicator 11 such as a meter.

For the frequency detector 10, an high-pass filter having a characteristic as shown in FIG. 2 may be used.

The operation of the embodiment thus constructed will now be described.

By turning a tuning knob 12 of FIG. 7 the values of tuning frequency determining elements (variable capacitors or variable capacitance diodes) in the RF amplifier 1 and the local oscillator 2 are varied with the rotation of the knob 12 to permit the reception of the desired incoming wave.

More particularly, the tuning frequency fa of the RF amplifier 1 varies from $f_L$ to $f_H$ in connection with the operation of the tuning knob 12, whereas the frequency of the output signal of the frequency multiplier circuit 13 is fixed at a frequency $fs = n \cdot fi$ which is a multiple of the IF frequency fi (10.7 MHz) of the IF amplifier 4.

By applying the outputs of the RF amplifier 1 and of the frequency multiplier circuit 13 (the frequencies of the respective outputs being fa and fs, the latter may be equal to $f_L$) to the mixer 9, a beat output signal at a frequency $f_M = fa - fs$ is detected at the output, which frequency $f_M$ varies from zero to $f_D = f_H - f_L$ with the operation of the tuning knob under the above condition.

By inputting said heat output signal to the frequency detector 10, an output voltage Eo is produced which is proportional to an input frequency as shown in FIG. 3. By applying this output to the indicator 11 such as a volt meter carrying a scale marked in frequencies, a needle pointer indication representing the receiving frequency is attained.

The present embodiment may be practiced in a so-called electronic tuning type tuner in which, as shown in FIG. 4, the receiving frequency is selected by varying the voltage applied across variable capacitance diodes (not shown) in the RF amplifier 1 and the local oscillator 2 through a variable resistor VR linked to the tuning knob 12.

As has been decribed above, in accordance with the present invention, a beat signal between a reference frequency signal and a receiving frequency representing signal such as between a local oscillator output and a separate fixed reference frequency oscillator output, between and RF amplifier output and a fixed reference frequency oscillator output, between a local oscillator output and a frequency-multiplied signal of an IF frequency signal, or between an RF amplifier output and a frequency-multiplied signal of an IF frequency signal is frequency-detected and the value of this detected output is fed to the indicator such as a meter to give an indication of the receiving frequency. Thus, even if ununiformity exists in the receiving frequency determining elements such as variable capacitors and variable capacitance diodes, deviation of the dial indication will not occur since the tuning knob itself is completely independent from the dial indicator.

Since the displacement of the indicator needle pointer is controlled by a voltage corresponding to the local oscillator frequency which always match with the receiving frequency, in order to give an indication of the receiving frequency deviation of dial scaling will not occur and it is possible to take any form of indication system such as linear scale or logarithmic scale. Furthermore, since no mechanically moving indicator element such as link wire for dial is required, trouble is unlikely to occur. Since deviation of scale does not occur even if variable capacitors are not uniform, correction is not required at all. When the present invention is applied to an electronic tuning type tuner, a main variable resistor may have any type of variation characteristic curve. Also since the indication of dial preset may be accomplished by a main dial, an additional dial indicator element for presetting which has been required in the prior art can be eliminated, thus permitting a remarkably cheap preset dial indication. The industrial advantage of the present invention is, therefore, remarkable and useful.

What we claim is:

1. In a broadcast receiver tuner for receiving a selected one of the broadcast frequencies, said selected one being designated the received frequency, a frequency indicator system comprising, first means for producing a first signal having a reference frequency, second means for producing a second signal having a frequency variable in accordance with the received frequency, a mixer connected to said first and second means for producing a third signal having a frequency equal to the difference frequency of said first and second signal frequencies, a frequency detector connected to said mixer for converting said third signal into a d.c. signal having an amplitude that varies in accordance with said difference frequency, and a meter connected to said detector and carrying a scale marked in receivable broadcast frequencies.

2. In a broadcast receiver tuner for receiving a selected one of the broadcast frequencies, a broadcast frequency received indicator system comprising:
  a local oscillator means for generating a signal having a frequency variable in accordance with the frequency of a received signal,
  a fixed frequency oscillator,
  means for mixing the output frequencies of said local oscillator and said fixed frequency oscillator to generate a difference frequency,
  means for converting said difference frequency to a voltage corresponding to said difference frequency, and
  display means for indicating the magnitude of said voltage.

3. In a broadcast receiver tuner for receiving a selected one of the broadcast frequencies, a broadcast frequency received indicator system comprising:
  a local oscillator generator means for generating a signal having a frequency variable in accordance with the frequency of a received signal,
  means for generating an intermediate frequency signal,
  means for frequency multiplying said intermediate frequency signal,
  means for mixing said multiplied intermediate frequency signal with said output signal of said local oscillator to derive a difference frequency,
  a frequency detector receiving said difference signal for converting said difference signal into a voltage having a magnitude corresponding to said difference frequency, and
  means for indicating the magnitude of said voltage.

4. In a broadcast receiver tuner for receiving a selected one of the broadcast frequencies, a broadcast frequency received indicator system comprising:
  means for generating an intermediate frequency signal,
  means for frequency multiplying said intermediate frequency signal,
  means for mixing said frequency multiplied intermediate frequency signal with said received frequency signal, said mixing means deriving a difference signal,
  means for converting said difference signal to a voltage having a magnitude which is proportional to said difference frequency, and
  means for indicating the magnitude of said voltage.

5. In a broadcast receiver tuner for receiving a selected one of the broadcast frequencies, said selected one being designated the received frequency, a frequency indicator system comprising, first means for producing a first signal having a constant reference frequency, second means for producing a second signal having a frequency variable in accordance with the received frequency, a mixer connected to said first and second means for producing a third signal having a frequency equal to the difference frequency of said first and second signal frequencies, a frequency detector connected to said mixer for converting said third signal into a DC signal having an amplitude that varies in accordance with said difference frequency, and a meter connected to said detector and carrying a scale marked in receivable broadcast frequencies.

6. In a broadcast receiver tuner for receiving a selected one of the broadcast frequencies, said selected one being designated the received frequency, means receiving said broadcast frequencies for selecting said received frequencies, first means responsive to the output of said selecting means for producing a signal having a frequency variable in response with said received frequency, second means for producing a second signal having a constant reference frequency, a mixer connected to said first and second means for producing a third signal having a frequency equal to the difference frequency of said first and second signal frequencies, a frequency detector connected to said mixer for converting said third signal into a DC signal having an amplitude that varies in accordance with said difference frequency, and a meter connected to said detector and carrying a scale marked in receivable broadcast frequencies.

* * * * *